(12) United States Patent
Geller

(10) Patent No.: US 9,993,062 B2
(45) Date of Patent: Jun. 12, 2018

(54) IMPACT-DAMPER ELEMENT FOR CARRYING STRAPS

(71) Applicant: Wolfgang-Peter Geller, Garlstorf (DE)

(72) Inventor: Wolfgang-Peter Geller, Garlstorf (DE)

( * ) Notice: Subject to any disclaimer, the term of this patent is extended or adjusted under 35 U.S.C. 154(b) by 0 days. days.

(21) Appl. No.: 15/524,338

(22) PCT Filed: Oct. 21, 2015

(86) PCT No.: PCT/EP2015/074295
§ 371 (c)(1),
(2) Date: May 4, 2017

(87) PCT Pub. No.: WO2016/071105
PCT Pub. Date: May 12, 2016

(65) Prior Publication Data
US 2017/0311704 A1 Nov. 2, 2017

(30) Foreign Application Priority Data
Nov. 5, 2014 (EP) .................................... 14191872

(51) Int. Cl.
*A45F 3/14* (2006.01)
*G03B 17/56* (2006.01)

(52) U.S. Cl.
CPC .......... *A45F 3/14* (2013.01); *A45F 2003/142* (2013.01); *G03B 17/561* (2013.01); *G03B 17/568* (2013.01)

(58) Field of Classification Search
CPC ........ A45F 3/12; A45F 2003/142; A45F 3/04; G03B 17/561; G03B 17/568
See application file for complete search history.

(56) References Cited

U.S. PATENT DOCUMENTS

| 279,706 | A | 6/1883 | Carrol |
| 4,976,388 | A | 12/1990 | Coontz |
| 6,220,492 | B1 * | 4/2001 | Huang ...................... A41F 9/00 2/268 |
| 6,279,795 | B1 * | 8/2001 | Pierzina .................... A45F 3/12 224/150 |
| 9,049,917 | B2 * | 6/2015 | Shereyk .................. A45F 3/047 |

(Continued)

FOREIGN PATENT DOCUMENTS

| FR | 2781349 A1 | 1/2000 |
| JP | 2008079952 A | 4/2008 |
| WO | 2012/145639 A2 | 10/2012 |

*Primary Examiner* — Corey Skurdal
(74) *Attorney, Agent, or Firm* — Sand & Sebolt

(57) ABSTRACT

An impact-damper element for carrying straps that is active in a longitudinal direction. The element has a flexible, flat band portion with two mutually opposite main surfaces, runs in a longitudinal direction in undulating lines that are deflected transversely to the longitudinal direction and have reversal points and transverse portions running between the reversal points. A support is applied to at least one of the main surfaces of the band portion, is fixed to the band portion, retains the band portion in a normal position along the undulating lines and is made of an elastic material. The support is of varying thickness over the course of the undulating lines; being of the smallest thickness in a central portion of the transverse portions of the band portion and the thickness increases from the central portion to the reversal points. The support is at its thickest at the reversal points.

18 Claims, 2 Drawing Sheets

(56) References Cited

U.S. PATENT DOCUMENTS

| | | | |
|---|---|---|---|
| 9,376,064 B2* | 6/2016 | Flaherty | B60R 9/10 |
| 2003/0056338 A1* | 3/2003 | Anscher | A01K 27/005 |
| | | | 24/71.1 |
| 2005/0098590 A1* | 5/2005 | Collier | A45F 3/12 |
| | | | 224/264 |
| 2005/0258205 A1* | 11/2005 | French | A45F 3/12 |
| | | | 224/264 |
| 2005/0279798 A1* | 12/2005 | Nassanian | A45F 3/12 |
| | | | 224/643 |
| 2006/0000858 A1* | 1/2006 | Jung | A45F 3/12 |
| | | | 224/264 |
| 2007/0261213 A1 | 11/2007 | Nolan et al. | |
| 2008/0292303 A1 | 11/2008 | Kope et al. | |

* cited by examiner

IMPACT-DAMPER ELEMENT FOR CARRYING STRAPS

TECHNICAL FIELD

The invention concerns an impact-damper element for carrying straps that is active in a longitudinal direction, comprising a flexible, flat belt portion that extends in longitudinal belt direction with two each other opposing main surfaces, where said belt portion is shaped into waves that extend transverse to the longitudinal direction, having reversing points and transverse portions that extend between the reversing points, and a layer made of elastic material that is attached to at least one of the main surfaces of the belt portion, where said layer is solidly bonded to the belt portion and retains the belt portion in an initial wavy shape. The invention concerns, moreover, a carrying strap comprising such an impact-damper element.

PRIOR ART

It is known to use carrying straps, in particular shoulder straps or neck straps, to carry heavy items. Carrying straps of this kind are used, for example, for carry cases, rifles or such like. Such carrying straps are also used in particular for carrying still cameras and movie cameras, known as so-called camera straps. One type of carrying strap has established itself in particular where the carrying strap is worn as a sling over one shoulder and across the chest, and where a camera is attached to said sling via a connecting adapter, which is freely moveable along the sling, and where said camera is located in its resting position approximately at hip height on the carrying strap. This type of camera strap is described, for example, in US 2008/0292303 A1.

Moreover, it is known that the carrying of heavy objects with such carrying straps can be particularly unpleasant for the carrier in instances where impulse-like tensile loads occur on the strap through, for example, the up and down movement during walking. Without cushioning, such tensile loads are transferred to the shoulder or the neck of the person using the carrying strap, applying abrupt high forces onto the strap and causing an unpleasant carrying experience. To counter this problem, it has long been known to use impact-damping elements that are integrated into or connected to the carrying strap in order to cushion occurring shocks and thus improve the carrying comfort for the user of a carrying strap that is fitted with a corresponding impact-damping element.

For example, the document U.S. Pat. No. 279,706 describes a carrying strap, which includes a section made of rubber or other elastic material that forms an impact damper, and attached thereto is a carrying hook. Said carrying strap as described in U.S. Pat. No. 279,706 is designed for and described as a carrying aid for coffin bearers.

Similarly designed impact-damping elements, which are provided at their ends with hooks and eyelets so that they can be attached to or removed from a carrying belt system, are described in US 2007/0261213 A1. The impact-damping elements there are also formed from flat, belt-like sections made from an elastic material, in which a retaining wire or rope, made from metal for example, may be provided, which is arranged in arches and spans the elastic belt section and thus could act as a stretch restrictor to prevent in this manner the overstretching or even rapture of said elastic section.

A different type of the impact-damping element is described in U.S. Pat. No. 4,976,388. In this instance a section of a belt strand that is made of an elastic material is attached to a non-elastic belt material, which is formed in arches and is rigidly attached to the elastic material in sections between the arches, so that an elastic longitudinal stretching and thus an impact-dampening effect is obtained to a certain degree through stretching of the elastic sections. This takes place up to a state in which the originally arched, non-elastic belt portions are stretched out straight and under tension so that further stretching is prevented.

An impact-damping element for carrying straps, is described, for example, in FR 2781349. This document describes an element in which a flexible carrying strap is arranged in a wave-like structure that extends transverse to the longitudinal direction of said belt portion, and which is provided with a layer made of an elastic material. Bonded to the concave, inner side of each individual return of the wave-like structure are individual bridging webs made from an elastic material, which create a return force opposite to a stretching force that acts on the carrying strap. The layer made from the elastic material forms the impact-damping element, together with the wave-like formation of the strap, which is forced by said layer to stay in a resting position. A comparable impact-damper element that operates in the same form and manner as the one described in FR 2781349, is described in US 2005/0258205 A1. In contrast to the design of the impact-damper element described in the above-named French document, the layer of elastic material, which retains the strap in the impact-damper element in the wave-shape, does not extend continuously across the main surface of the belt portion but only in strips that extend in parallel and longitudinal direction of the belt portion, between which the wave-shaped main surfaces of the belt portion in the impact damper element are visible.

The previously known impact-damper elements, in particular those according to FR 2781349 and US 2005/0258205 A1, have essentially proven effective and suitable for use in conjunction with carrying straps. As a result of the wave-shape of the belt portion they provide in longitudinal direction of the belt portion a large expansion stroke. Due to the choice of material and the thickness of the layer of elastic material they can be manufactured to have different restoring forces and can thus be adapted to different weights that are attached to a carrying strap that is fitted with said impact-damper element.

However, due to the above-described design of the prior art solutions, in particular due to the continuous and essentially uniform thickness of the layer of elastic material, the optimal impact-damping characteristics only apply to an attached weight that falls within a narrow spectrum. This is of no consequence if the carrying strap is to be used to carry items of a predetermined weight. It is critical, however, if a carrying strap fitted with the impact-damper element is used to carry items of very different weights and corresponding demands on the restoring forces of the impact-damper element. Such a situation arises, for example, if an impact-damping element of this design is to be integrated into a camera strap, as has been disclosed and described in US 2008/0292303 A1. This is because still cameras or movie cameras that are to be attached to such a carrying strap may have widely varying weights. Small compact cameras may only weigh around 100 g, whereas SLR cameras with heavy, attached telephoto lenses could weigh much more than 5 kg. To be able to achieve an optimal impact-damping effect across such a weight range, which not only provides an improved carrying comfort particularly when attaching cameras to the carrying strap, but also protects the sensitive equipment from vibrations caused by impacts and the resulting damage, is not possible, or only to a very limited degree, with the prior art impact-damper elements of the kind described above.

DESCRIPTION OF THE INVENTION

It is the object of the invention to provide an improvement to the impact-damper elements described at the outset, where said improvement provides, due to its design, a useful impact-damping effect across a wide range of applied tensile forces (that is, a weight acting on the belt portion).

According to the invention said object is achieved through an impact-damping element for carrying straps, effective in longitudinal direction and wherein the element comprises a flexible, flat belt portion that extends in a longitudinal belt direction with two opposing main surfaces, where said belt portion is shaped into waves that extend transverse to the longitudinal direction, having reversing points and transverse portions that extend between the reversing points, and a layer made of elastic material that is attached to at least one of the main surfaces of the belt portion. The layer is solidly bonded to the belt portion and retains the belt portion in an initial wavy shape. The layer, made of elastic material, exhibits a varying thickness in the progression of the waves, where the layer exhibits the smallest thickness in the transverse portion of the belt portion in a middle section of layer, where, starting from the middle section towards the reversing points, the thickness increases and the thickness of the layer made of elastic material is the greatest at the reversing points. Advantageous further developments of such an impact-damping element include that the layer may be made from an elastic polymer material. The belt portion may be made of a textile material, in particular a woven or knitted material. Alternatively, the belt portion may be made from leather. The layer made from the flexible material may be produced through moulding or injecting into the belt portion or through recasting or overmolding of belt portion and may be bonded to the belt portion. The elastic material may be disposed on both main surfaces of the belt portion. The increased thickness of the layer of the elastic material may be disposed at the reversing points on the convex outer side of the belt portion. The layer made of the elastic material may be applied across the entire width of belt portion. The belt portion may be formed into two to ten waves, in particular into three to six of such waves, with each having an upper and a lower reversing point. In the belt portion, below the layer, there may be disposed a reinforcing element, in particular a metallic wire or metallic rope, preferably a steel wire or steel rope, and this reinforcing element may extend in longitudinal belt direction, and is in particular bonded to the belt portion. In a further aspect of the invention a carrying strap is proposed with integrated impact-damper element according to the invention. Advantageous further developments of such a carrying strap are that the belt portion may be an integral part of the carrying strap and that the carrying strap is designed as a camera strap.

According to the invention, an impact-damping element for carrying straps that is effective in longitudinal direction comprises firstly a flexible belt portion that extends in longitudinal strap direction. Said belt portion is flat and has two each other opposing main surfaces. The belt portion of the impact-damping element is shaped into waves that extend transverse to the longitudinal direction. Said waves have reversing points and transverse portions that extend between the reversing points. Moreover, a layer made of elastic material is applied to at least one of the main surfaces of the belt portion in the vicinity of the waves and is solidly bonded to the belt portion. Said layer of elastic material retains the belt portion in an initial wavy shape. The impact-damper element according to the invention is up to this point the same as the prior art element known from US 2005/0258205 A1 and FR 2781349.

Nevertheless, compared to the impact-damper elements of the prior art, the impact-damper element according to the invention is designed differently and is characterised in that the layer of elastic material is applied at a varying thickness in the progression of the waves, that is, the layer has the least thickness in the middle sections of the transverse portions of the belt portion and, starting from the middle section to the reversing points, the thickness increases until the layer is at its thickest at the reversing points.

As a result of designing the layer with varying thickness which, starting from a middle section of the transverse section of the wavy belt portion, increases and exhibits the greatest thickness at the reversing points, depending on the tensile force applied in longitudinal direction of the impact-damper element, that is, dependent on a weight that is carried with a carrying strap provided with the impact-damper element, a deflection of the impact-damper element is caused at different locations or sections respectively. To start with, at a low weight or due to a small tensile force due to an impact, the impact-damper element is only deflected in the middle sections of the transverse portions, that is, in those sections where the layer of elastic material is at its thinnest. Since said transverse portions extend obliquely or transverse to the longitudinal direction in which the impact-damper element is effective, an elastic deformation occurs in these sections and thus an expansion of the impact-damper element in its longitudinal direction and therefore an impact-damping effect in this direction is achieved. As soon as the impact-damping effect in these sections is at its highest, that is, the impact-damper element is deflected in the middle sections of the transverse portions, the sections located closer to the reversing points, where the thickness of the layer increases, come under load and are deflected where, due to the thicker material of the elastic layer, a greater amount of force is required for the deflection and thus a greater restoring force is provided. Nevertheless, this loading may already take place parallel to a further deflection of the impact-damper element in the middle sections. Said sections with increasing thickness of the layer material thus deform at higher weight forces or higher deflection forces caused by shocks. As soon as also these sections, or the restoring effect from these sections, is fully or at least largely exhausted, a deflection through opening up or bending at the reversing points takes place where the thickness of the elastic material layer is greatest and thus provides the highest restoring force, that is, for a certain amount of deflection a correspondingly high weight or a correspondingly high deflection force must be present.

It is therefore possible to dampen impacts over a wide range of deflection forces; an impact-damper element according to the invention is able to provide sufficient impact-damping effect for weights across a large range; it is effective for weights in a range of, for example, 100 g to more than 5 kg if the impact-damper element according to the invention is used or integrated in a camera strap, for example, if a corresponding design of the layer, the varying thickness and the corresponding number of waves in the impact-damper element are provided.

The material of the belt portion itself may have a certain elasticity and thus the ability of providing an elastic expansion, in particular in longitudinal belt direction, but this is not absolutely necessary. It is sufficient if the material of the belt portion is flexible and not elastically deformable.

According to an advantageous further development of the invention the layer of elastic material may be made from a polymer. Polymers are materials with particularly good elastic characteristics, and are in particular elastic materials that are adjustable over a wide range through a corresponding choice of polymer or polymer blend. The chosen polymer may be based on natural rubber, or it may be made on a synthetic basis.

The belt portion may be made in particular from a textile material, woven or knitted in particular. It may, however, also be made from a different material, for example leather.

Moreover, according to an advantageous embodiment of the invention, the layer may be made from the flexible material through infusing into or recasting around the material of the belt portion, or though injection into or overmolding around the material of the belt portion. If the layer of flexible material is produced in this manner in which, for example, the belt portion made form a textile material is placed into a mould in a wavy shape and then a liquefied, flexible material is introduced into the mould, in particular injected, the layer adheres well to the material of the belt portion and thus creates the solid connection with the belt portion that is required by the invention so as to retain said belt portion in the initial wave shape.

The elastic material may only be disposed on one of the two main surfaces of the belt portion. However, according to an advantageous further development of the invention it is disposed on both main surfaces of the belt portion. Besides purely aesthetic effects and advantages, this embodiment has also the advantage that the material of the belt portion is hidden under the layer and protected.

Advantageously, the thicker part of the layer of elastic material at the reversing points is disposed only on the convex outer side of the belt portion. In other words, even if the layer of elastic material is applied to both main surfaces of the belt portion, the increased thickness in the vicinity of the reversing points is achieved by a correspondingly thicker design of the elastic material layer on the convex outer side. This design permits the waves to be arranged particularly tightly together since the inside is not covered with an increased thickness of the material, which would otherwise lead to a "merging" of the waves in this section. The elastic restoring force of the elastic material is thus not achieved by a tensile load but through a compression load, even if the applied force leads to a deformation of the belt portion together with the elastic material applied thereon in the vicinity of the reversing points, where the layer of elastic material is the thickest.

The layer of elastic material in the impact-damper element according to the invention may advantageously still be applied across the entire width of the belt portion. This measure also means that the belt portion is fully covered by the elastic material, or the layer of elastic material respectively, and is thus not only optically hidden but is also protected.

As already mentioned, the impact-damping characteristic of the impact-damper element according to the invention may not only be changed through the choice of the elastic material of the layer and the thickness of the layer in the variation of said thickness to be provided according to the invention along the progression of the belt portion that was formed into waves, but also through the number of waves (in this instance one wave consists of one upper and one lower reversing point, that is, a complete wave length). The more waves of this kind are present the greater is the possible deflection and thus the impact-damping effect in the longitudinal direction of the impact-damper element. Nevertheless, there will be an upper limit set to the number of waves, not only due to optical aspects but also due to a limited availability of space since the longitudinal expansion of the impact-damper element and thus a change in length of the carrying strap fitted with said impact-damper element must be kept within limits. In an advantageous embodiment the belt portion is provided with two to ten waves with each comprising one upper and one lower reversing point, in particular three to six of such waves. It is also possible to provide a number with half a wave, for example four and a half waves, so that for example there are five upper but only four lower reversing points provided.

Another advantageous further development of the invention is that on the belt portion, below the layer, a reinforcing element may be provided that extends in longitudinal direction of the belt, which may be in particular a metallic wire or a metallic rope, preferably a steel wire or a steel rope, where said reinforcing element may in particular be attached to the belt portion. A reinforcing element of this kind may fulfil various functions. Firstly, it can act as a further "stop" against over-stretching of the impact-damper element in the instance that it is stretched beyond a load limit that can be supported by the belt portion, to prevent ripping of the belt. Secondly, and this in particular, such a reinforcing element can serve as cutting protection for the impact-damper element and thus, if a carrying strap is fitted with one, it provides in particular a theft-protection for valuable items that are attached to the carrying strap (handbags, cameras etc.).

As already mentioned at the outset, a further aspect of the invention consists of a carrying strap with an impact-damper element as described above. Such a carrying belt makes use of the above-described advantages of the impact-damper element.

Such a carrying strap may, according to an advantageous further development, be integrally attached to the impact-damper element in such a way that the belt portion is an integral component of the carrying strap. In other words, the belt portion in this instance is formed by a longitudinal section of the carrying strap, which is placed into a wavy shape and to which the layer of elastic material is applied, where said layer of elastic material is formed with changing thickness according to the invention, characteristic of the impact-damper element.

The carrying strap according to the invention may in particular be designed as a camera strap, as already mentioned above. In this instance the impact-damper element may, for example, be disposed in a section that follows the shoulder pad.

BRIEF DESCRIPTION OF THE DRAWINGS

Further advantages and characteristics of the invention become apparent from the following description of an exemplary embodiment by way of the attached figures. Shown are in.

WAY(S) TO IMPLEMENT THE INVENTION

Figure 1:
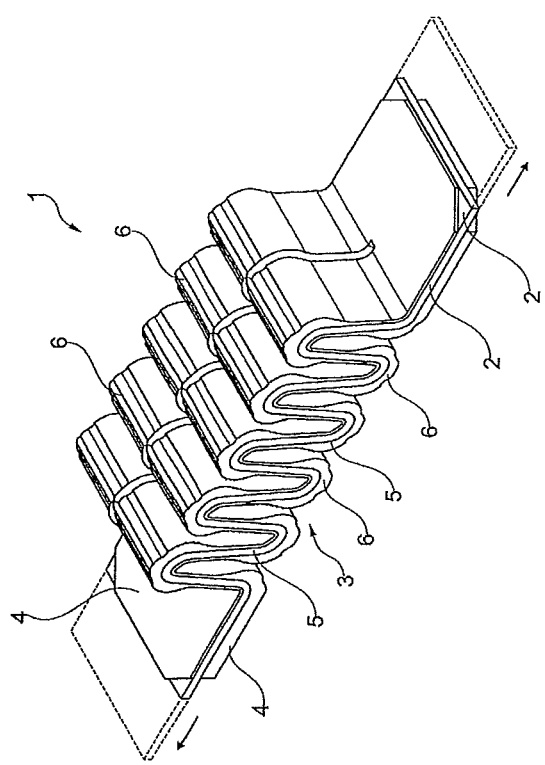
FIG. 1 a perspective view of an impact-damper element according to the invention in one possible configuration.

The figures depict a schematic representation of a possible exemplary embodiment of an impact-damper element according to the invention as it may be made as a separate, for example detachable, element for arrangement on a carrying strap or integration into a carrying strap. The impact-damper element is generally identified in the figures with the reference number 1. Said impact-damper element 1 is comprised of a belt portion 2, which may in particular be an integral part of a complete carrying strap, but it may also be a separate belt portion 2 that is limited in its length essentially to the length of the impact-damper element 1. In a wavy section 3, said belt portion 2 is formed into waves that extend transverse to the longitudinal belt direction, where the belt portion 2 is formed into transverse portions 5 that extend transverse to the longitudinal direction L of the impact-damper element, in which longitudinal direction L the impact-damper element 1 is effective, and is returned at reversing points 6 located between said transverse portions 5.

On both of the each other opposing main surfaces of the flexible but not necessarily elastic belt portion 2 a layer 4 made of an elastic material, in particular a polymer material, is applied and solidly bonded to the material of the belt portion 2. The belt portion 2 may be made in particular from a woven or knitted textile material, or from leather or some other material (e.g. plastic), and the layer 4 made of elastic material, in particular polymer, may be applied by overmolding the belt material of the belt portion 2, which provides a solid bond with the belt portion 2. This method of application and bonding of the layer 4, which is made of elastic material, is achieved in a corresponding mould where the belt portion 2 is already placed in the wavy section 3 in a wavy shape, so that the elastic material of layer 4 fixes this shape of the belt portion 2 and thus that of the impact-damper element 1 in said section 3.

Due to the elasticity of the material of layer 4, the impact-damper element 1 yields in the wavy section 3 under a tensile force in longitudinal direction L and is able to deform elastically while generating a restoring force. This achieves the impact-damping effect.

The particular characteristic of the impact-damper element 1 of the invention, as shown in the exemplary embodiments depicted in the figures, is that the thickness (transverse, seen in particular perpendicular to the main surfaces of the belt portion 2) of the layer 4 made of the elastic material varies along the progression of the belt portion 2 in the wavy section 3. The layer 4 made of elastic material is thinnest in the middle section 7 of the transverse portions 5, but then increases in consecutive sections 8 in the direction of the reversing points 6, and is the thickest at the reversing points 6. This is particularly apparent in FIG. 2. This design has the effect that, in the instance of only small tensile forces in the longitudinal direction L, an elastic deformation of the impact-damper element 1 in the wavy section 3 takes place only through bending in the vicinity of the middle sections 7 of the transverse portions 5. The sections 8 with an increasing thickness of the elastic layer 4 are only then included in the deformation, and thus in the effect of impact-damping, when the tensile force in longitudinal direction L increases. Only with larger forces acting in longitudinal direction L will the impact-damper element 1 deform in the wavy section 3 at the reversing points 6 as well, where the elastic layer 4 is thickest and thus the force to be applied to achieve a deformation is the highest.

Through this design of sections that have a defined varying spring force it is selectively possible to dampen already small impacts where a deformation takes place only in the vicinity of the middle sections 7 of the transverse portions 5, but at the same time it is possible to dampen high impact forces in longitudinal direction L by causing a deformation of layer 4 also in the sections 8 with increasing thickness of layer 4 as well as at the reversing points 6. In any case, that is, in the instance of a deformation of only the middle sections 7 of the transverse portions 5, in the instance of a deformation also of the sections 8 with increasing thickness of the elastic layer 4 towards the reversing points 6, or in the instance of a deformation in the vicinity of the reversing points 6 themselves, there is always a change in length, that is, an expansion of the impact-damper element 1 in longitudinal direction L while creating a corresponding restoring force that increases with the deformation of the individual section in the above-stated sequence. This means that in a single impact-damper element 1 a gradual impact-dampening effect is achieved across a wide range, for small loads up to high loads, so that correspondingly small weights up to large weights can be carried safely with one and the same impact-damper element 1 and, with respect to the damping of possible impacts, can be secured.

Figure 2:
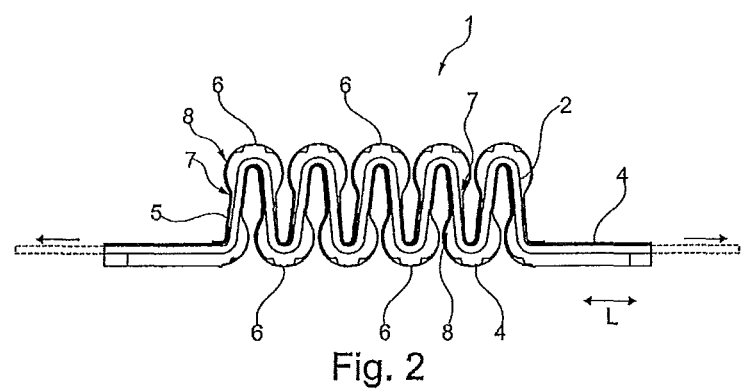
FIG. 2 a side elevation of the impact-damper element according to FIG. 1.

As is apparent from FIG. 2, moreover, the elastic layer 4 is applied at the reversing points with their respective thickened section on the convex-shaped, outer side of the reversing points. The layer is minimally thin on the concave-shaped, inner side and is no different in its thickness from the one in the middle section 7 of the transverse portion 5. This measure makes it possible to provide a tight arrangement of waves with folds of close to 180° at the reversing points 6 of the belt portion 2 without filling or bridging the tight gaps with the thickened layer 4 of elastic material. A compact but still highly effective impact-damper element 1 may be achieved in this way.

Figure 3:
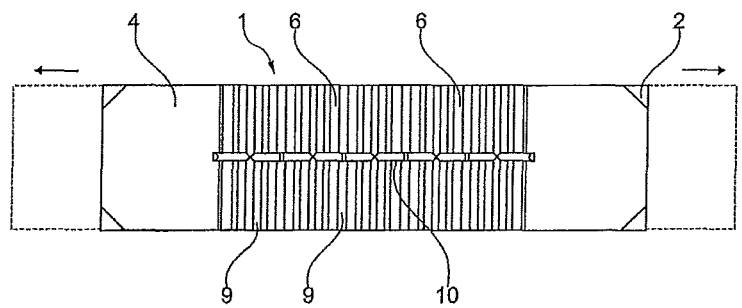
FIG. 3 a plan view of the impact-damper element of FIG. 1.

As is particularly apparent from FIGS. 1 and 3, the layer 4 made of elastic material is not only applied to the two main surfaces of the belt portion 2 but extends over its entire width. It is further apparent from FIGS. 1 and 3 that in the vicinity of the reversing points 6 transverse structures 9 in form of transverse grooves and transverse ridges are formed. Moreover, an approximately centrally arranged longitudinal ridge 10 extends across the wavy section 3 in longitudinal belt direction, thus following the waves. Although said structures, like transverse structure 9 and longitudinal ridge 10, may be designed so that they have a functional effect, for example an intended weakening of the layer 4 in the vicinity of the reversing points 6 (through the transverse structures 9), but are in this instance simply a visual design feature.

To the observer, the longitudinal ridge 10 has the optical effect of a steel rope, which is not shown in detail in the figures but is preferred to be present in the exemplary embodiment. Said steel rope is attached to the belt portion 2 in longitudinal belt direction, is connected to the belt portion 2 and is hidden underneath the elastic layer 4. Said steel rope has not only the function of an additional end-stop element to safeguard against overstretching the impact-damper element 1 in longitudinal direction L, but also serves as theft protection in particular as it prevents the impact-damper element 1 from being cut through.

The impact-damper element 1 as shown in the figures is preferably integrated in a carrying strap in that a section of the carrying strap itself forms the belt portion 2, onto which the layer 4 of elastic material is applied. A carrying strap of this kind may be designed in particular as a camera strap.

LIST OF REFERENCE NUMBERS

1 Impact-damper element
2 Belt portion
3 Wavy section

4 Elastic layer
5 Transverse portion
6 Reversing point
7 Middle section
8 Section with increasing thickness of the elastic layer
9 Transverse structure
10 Longitudinal ridge
L Longitudinal direction

The invention claimed is:

1. An impact-damper element for carrying straps that is active in a longitudinal direction, said impact-damper element comprising:
    a flexible, flat belt portion that extends in longitudinal belt direction, said belt portion having two opposing main surfaces, wherein said belt portion is shaped into waves that extend transverse to the longitudinal belt direction and has reversing points and transverse portions that extend between the reversing points;
    a layer made of elastic material that is attached to at least one of the main surfaces of the belt portion, wherein said layer is solidly bonded to the belt portion and retains the belt portion in an initial wavy shape; wherein the layer is made of elastic material that exhibits a varying thickness in a progression of the waves wherein the layer exhibits a smallest thickness in the transverse portion of the belt portion in a middle section of the layer and wherein, starting from the middle section towards the reversing points, the thickness increases and the thickness of the layer is the greatest at the reversing points.

2. The impact-damper element according to claim 1, wherein the layer is made from an elastic polymer material.

3. The impact-damper element according to claim 1, wherein the belt portion is made of a textile material.

4. The impact-damper element according to claim 3, wherein the belt portion is made from a woven or knitted textile material.

5. The impact-damper element according to claim 1, wherein the belt portion is made from leather.

6. The impact-damper element according to claim 1, wherein the layer made from the flexible material is produced through moulding or injecting into the belt portion or through recasting or overmolding of belt portion and is bonded to the belt portion.

7. The impact-damper element according to claim 1, wherein the layer of the elastic material is disposed on both main surfaces of the belt portion.

8. The impact-damper element according to claim 1, wherein the increased thickness of the layer of the elastic material is disposed at the reversing points on a convex outer side of the belt portion.

9. The impact-damper element according to claim 1, wherein the layer made of the elastic material is applied across an entire width of the belt portion.

10. The impact-damper element according to claim 1, wherein the belt portion is formed into two to ten waves, with each wave having an upper and a lower reversing point.

11. The impact-damper element according to claim 10, wherein the belt portion is formed into three to six waves.

12. The impact-damper element according to claim 1, wherein on the belt portion, below the layer, there is disposed a reinforcing element and the reinforcing element extends in the longitudinal belt direction.

13. The impact-damper element according to claim 12, wherein the reinforcing element is a metallic wire or a metallic rope.

14. The impact-damper element according to claim 13, wherein the metallic wire or the metallic rope is a steel wire or a steel rope, respectively.

15. The impact-damper element according to claim 13, wherein the reinforcing element is bonded to the belt portion.

16. A carrying strap comprising an impact-damper element according to claim 1.

17. The carrying strap according to claim 16, wherein the belt portion is an integral part of the carrying strap.

18. The carrying strap according to claim 16 that it is designed as a camera strap.

* * * * *